(12) United States Patent
Lindsey et al.

(10) Patent No.: US 8,708,259 B2
(45) Date of Patent: *Apr. 29, 2014

(54) FILLER RECOVERY PROCESSES

(75) Inventors: James A. Lindsey, Cartersville, GA (US); Paul Meredith, Summerville, GA (US)

(73) Assignee: Mohawk Carpet Distribution, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 13/491,280

(22) Filed: Jun. 7, 2012

(65) Prior Publication Data

US 2012/0241542 A1    Sep. 27, 2012

Related U.S. Application Data

(63) Continuation of application No. 12/544,758, filed on Aug. 20, 2009, now Pat. No. 8,205,814, which is a continuation-in-part of application No. 11/564,692, filed on Nov. 29, 2006, now Pat. No. 7,635,099.

(60) Provisional application No. 61/090,428, filed on Aug. 20, 2008, provisional application No. 60/740,520, filed on Nov. 29, 2005.

(51) Int. Cl.
*B02C 11/08* (2006.01)
*B02C 21/00* (2006.01)

(52) U.S. Cl.
USPC .......... 241/23; 241/24.19; 241/24.29; 241/29

(58) Field of Classification Search
USPC ........... 241/23, 29, 24.19, 24.29, 65, DIG. 38
See application file for complete search history.

(56) References Cited

U.S. PATENT DOCUMENTS

| | | | |
|---|---|---|---|
| 3,936,554 A | 2/1976 | Squier | |
| 4,028,159 A | 6/1977 | Norris | |
| 4,519,114 A | 5/1985 | Rhyne | |
| 5,169,870 A | 12/1992 | Corbin et al. | |
| 5,230,473 A | 7/1993 | Hagguist et al. | |
| 5,233,021 A | 8/1993 | Sikorski | |
| 5,294,384 A | 3/1994 | David et al. | |
| 5,397,066 A | 3/1995 | Leitman et al. | |

(Continued)

FOREIGN PATENT DOCUMENTS

CA    2206759    12/1998

OTHER PUBLICATIONS

Cline, Damon, "Plant Solves Decades-Old Problem," Augusta Chronicles, Mar. 21, 2004, <http://chronicle.augusta.com/stories/032104/bus_568062.21,shtml>.

(Continued)

*Primary Examiner* — Bena Miller
(74) *Attorney, Agent, or Firm* — Alston & Bird LLP

(57) ABSTRACT

Various embodiments of the present invention generally provide processes for recovering and/or using one or more constituent components of carpeting. More specifically, various embodiments provide processes for reclaiming a filler material from carpet as well as processes for using the recovered filler material in subsequent carpet manufacturing processes. The present filler recovery processes can provide recycled filler material, which can be extracted at various stages of processing, and in different purities, depending on the subsequent need or use for the recovered filler material. In some instances, the filler recovery processes described herein can be implemented as sub-processes for recycling other carpet components.

17 Claims, 2 Drawing Sheets

(56) References Cited

U.S. PATENT DOCUMENTS

| | | |
|---|---|---|
| 5,518,188 A | 5/1996 | Sharer |
| 5,535,945 A * | 7/1996 | Sferrazza et al. .......... 241/24.12 |
| 5,598,980 A | 2/1997 | Dilly-Louis et al. |
| 5,722,603 A | 3/1998 | Costello et al. |
| 5,908,164 A | 6/1999 | Robinson et al. |
| 6,029,916 A | 2/2000 | White |
| 6,059,207 A | 5/2000 | Costello et al. |
| 6,126,096 A | 10/2000 | Robinson et al. |
| 6,155,429 A | 12/2000 | Clark |
| 6,250,575 B1 | 6/2001 | White |
| 6,398,138 B1 | 6/2002 | Robinson et al. |
| 6,752,336 B1 | 6/2004 | Wingard |
| 6,786,988 B1 | 9/2004 | Bell |
| 6,814,826 B1 | 11/2004 | Bell |
| 6,953,119 B1 | 10/2005 | Wening |
| 7,045,590 B2 | 5/2006 | Bell |
| 7,635,099 B1 * | 12/2009 | Meredith et al. ................. 241/21 |
| 2003/0225170 A1 | 12/2003 | Courage et al. |
| 2007/0045455 A1 | 3/2007 | Tuzson et al. |
| 2008/0113146 A1* | 5/2008 | Wright et al. ................... 428/95 |
| 2009/0075017 A1 | 3/2009 | Hensler et al. |
| 2011/0288188 A1* | 11/2011 | Walters ........................... 521/40 |

OTHER PUBLICATIONS

Shaw Industries Group, Inc., "Sustain: Strength Amidst Change, Shaw Industries Sustainability Report," 2008, 27 pages, USA.

"Regional Model—100 Million Pounds—50,000 Tons/YR of Recycled Carpet Waste and Whole Carpet Waste," Pyroflex, LLC, 2008.

* cited by examiner

FILLER RECOVERY PROCESSES

CROSS-REFERENCE TO RELATED APPLICATIONS

This application is a continuation of U.S. application Ser. No. 12/544,758 filed Aug. 20, 2009, which claims the benefit of U.S. Provisional Application No. 61/090,428, filed Aug. 20, 2008 and which is a continuation-in-part of U.S. patent application Ser. No. 11/564,692, filed Nov. 29, 2006, which claims the benefit of U.S. Provisional Application No. 60/740,520, filed Nov. 29, 2005. All of these applications are hereby incorporated by reference in their entirety.

FIELD OF THE INVENTION

Various embodiments of the present invention relate generally to component recovery processes. More specifically, various embodiments of the present invention relate to processes for recycling one or more constituent components of a carpet as well as to processes for using the recovered constituent components in subsequent carpet manufacturing processes.

BACKGROUND OF THE INVENTION

A standard, whole carpet construction generally includes fiber tufts, a backing, a filler material, and an adhesive material. One such construction of carpeting is illustrated schematically in FIG. 1, and is generally designated by reference numeral 1. The carpet 1 includes face yarn 2, which is tufted into a woven or spunbonded fabric known as a primary backing 5. The primary backing 5 has pile yarns 2 tufted therethrough extending outwardly from one face, a primary backcoating or precoat 3 on the opposite face, and at least one secondary backcoating or main coat (frequently called a skip coat) 4. Other layers may also be associated with the carpet 1.

The primary backcoating or precoat 3 generally comprises carboxylated latex (e.g., a styrene-butadiene-based latex), PVC (polyvinylchloride), EVA (ethylene-vinyl acetate), or other polymer-based material, and the secondary backcoating 4 may also include polymers. One or both of the primary backcoatings 3 and secondary backcoating(s) 4 can include a filler material. The most common filler is a mineral filler, such as calcium carbonate, although other fillers, such as alumina trihydrate, bauxite, magnesium hydroxide, or the like, may be utilized. In certain situations, calcium carbonate can be used with other common materials such as metal salts. The carpet 1 may be produced with the filler in one or both of the primary backcoating 3 and secondary backcoating(s) 4 comprising waste carpeting as all or part of the filler.

The carpet 1 may also include any number of other layers, depending upon its intended use. For example, the carpet 1 may have a secondary backing, such as a woven or nonwoven (e.g., spunbonded, melt blown, hydroentangled, or needle punched) fabric adapted to contact the floor or padding.

In making the carpet 1, generally, the fiber tufts are tufted through a woven or non-woven fabric, which is the primary backing 5. The part of the tufts on the exposed surface of the carpet comprises the face fiber or face yarn 2. A primary backcoatings 3 is applied to the back of the tufted structure to lock in the tufts. Next, a woven or non-woven secondary backing 4 is attached to the back of the primary backing 5 to give the carpet added dimensional stability.

Typically, the very edges of the carpet have no fiber tufted through the primary backing 5 or any adhesive applied for a width of about 1.75 to about 4.5 inches. These edges are parallel to the machine direction of the carpet manufacturing process, and are used to guide the carpet through the machinery, for example by means of pins in the machinery, which pierce the edge of the carpet and hold it under tension.

As a final step, and prior to rolling up the carpet for sale (or, in some cases, prior to installation), these parallel edges, having served their purpose, are trimmed from the carpet, producing what is termed carpet selvage edge trim waste. Such edge trim waste can be about 3 to about 6 inches in width, and can have a small portion of tufts of about 1.25 to about 4.25 inches in width, at one edge.

Thus, the edge trim is primarily a narrow swath of the whole carpet structure with generally a higher weight percentage of the backing than the whole carpet structure. By way of example, TABLES 1 and 2 provide representative compositional data for a whole carpet and carpet selvage edge trim, respectively. As can be seen from the data, the face fiber component, which is more expensive, is kept to a minimum on the edge trim, and the whole carpet typically has less than about 20% backing, while edge trim has greater than or equal to about 20% backing.

TABLE 1

General composition for a whole carpet construction

| Composition (%) | Component |
| --- | --- |
| 40-60 | Face fiber (e.g., nylon 6, nylon 6,6, polypropylene, polyester, wool, cotton, acrylic, and combinations thereof) |
| 8-20 | Backing primary and secondary (e.g., polypropylene) |
| 30-50 | Filler material (e.g., calcium carbonate) |
| ≤10 | Adhesive material (e.g., SBR latex rubber) |

TABLE 2

General composition for carpet selvage edge trims

| Composition (%) | Component |
| --- | --- |
| ≤60 | Face fiber |
| ≥20 | Backing primary and secondary |
| ≤40 | Filler/adhesive material residue |

There are a variety of processes available for recycling carpet components from post-industrial processing and/or post-consumer use. For example, with respect to carpet selvage edge trim, U.S. Pat. No. 4,028,159 discloses heating the selvage edge trim to produce a mixture of meltable resins that is separated from any solid residue. This mixture of meltable resins may then be used in an adhesive mixture for subsequent carpet manufacture. This melt filtration process can produce recovered polymer that has been significantly degraded, adversely impacting the recovered polymer's physical properties. Finally, while the resulting mixed resin may be used in carpets with hot melt adhesive backings, as disclosed in Applicant's own U.S. Pat. No. 6,814,826, herein incorporated by reference in its entirety, it is not desirable in SBR latex-backed carpets, for example, and the mixed resin has little value if sold on the market as a polymer.

In addition, U.S. Pat. No. 6,059,207 describes a carpet selvage waste polymer recovery process that first segregates edge trim by face fiber type, and then shears the desired polymer face fibers for highly purified recovery. This process is not being practiced, possibly owing to its complexity (multiple intricate mechanisms, carpet mill cooperation and coordination of their variable processes), and the high cost associated with multiple lines and locations for economic viability of face fiber recovery.

These processes, and others, which primarily focus on recovery of the polymeric component, place little, if any, emphasis on recycling the filler material. A need, therefore, exists for processes that are capable of recovering filler material from carpeting in an efficient and effective manner. It would be beneficial if these processes could also be applied to the recovery of filler from post-consumer whole-carpet scraps and pieces, as well as alloys or mixtures of selvage and whole-carpet scraps and pieces. Finally, it would be beneficial to be able to reuse the recovered filler in subsequent carpet manufacturing processes.

BRIEF SUMMARY OF THE INVENTION

Briefly described, the various embodiments of the present invention are directed to processes for recovering one or more constituent components from carpeting waste, such as post-industrial selvage edge trim and post-consumer carpet pieces and scraps. More specifically, the various embodiments relate to carpet recycling processes where a recovered constituent component is filler material. Other embodiments are directed to processes for using the recovered constituent component in subsequent carpet manufacturing processes.

In one aspect of the invention, a recovery process for recovering filler material from carpet waste is provided. The recovery process includes the steps of: providing carpet waste that includes at least one of post-industrial carpet, carpet selvage, or post-consumer carpet; size-reducing the carpet waste into particulate matter comprising polymer fibers, filler material and adhesive material; separating the particulate matter into a first stream comprising substantially polymer fibers and a second stream comprising substantially filler material and adhesive material; and heating the second stream at a temperature sufficient to remove at least some of the polymer fibers remaining in the second stream to enrich the content of filler material in the second stream.

In another aspect of the invention, another recovery process for recovering filler material from carpet waste is provided. The recovery process includes the steps of: providing carpet waste that includes at least one of post-industrial carpet, carpet selvage, or post-consumer carpet; size-reducing the carpet waste into particulate matter comprising polymer fibers, filler material and adhesive material; screening the particulate matter to separate a first stream comprising the polymer fibers from a second stream comprising the filler material and the adhesive material; size-reducing the second stream using attrition methods to create size reduced particles; heating the size-reduced second stream to a temperature sufficient to volatize the adhesive to enrich the content of filler material in the second stream thereby creating an enriched second stream; and separating the size reduced particles based on size.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
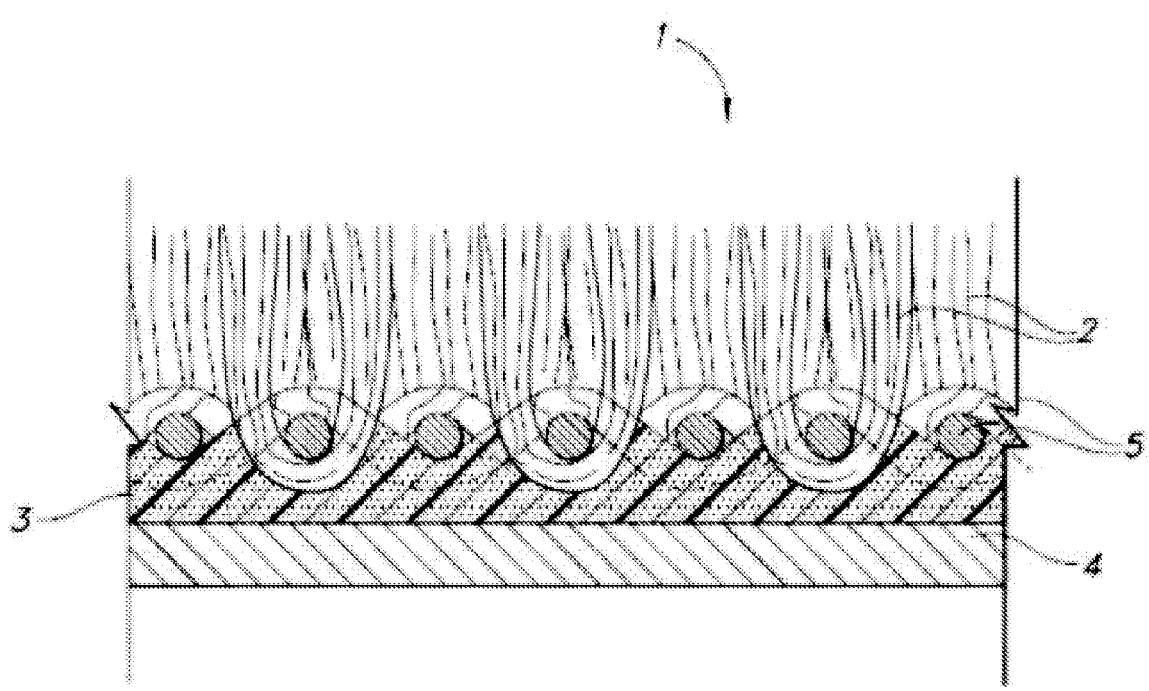
FIG. 1 is a representative schematic illustration of an existing whole-carpet construction.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to the figure, wherein like reference numerals represent like parts throughout the several views, exemplary embodiments of the present invention will be described in detail. Throughout this description, various components may be identified having specific values or parameters, however, these items are provided as exemplary embodiments. Indeed, the exemplary embodiments do not limit the various aspects and concepts of the present invention as many comparable parameters, sizes, ranges, and/or values may be implemented. The terms "first," "second," and the like, "primary," "secondary," and the like, do not denote any order, quantity, or importance, but rather are used to distinguish one element from another. Further, the terms "a", "an", and "the" do not denote a limitation of quantity, but rather denote the presence of "at least one" of the referenced item.

Various embodiments of the present invention generally provide processes for recovering and/or using one or more constituent components of carpeting. More specifically, various embodiments provide processes for reclaiming a filler material from carpet as well as processes for using the recovered filler material in subsequent carpet manufacturing processes. The present filler recovery processes can provide recycled filler material, which can be extracted at various stages of processing, and in different purities, depending on the subsequent need or use for the recovered filler material. In some instances, the filler recovery processes described herein can be implemented as sub-processes for recycling other carpet components.

The raw feed material, generally designated RM throughout this disclosure, can include one, or a mixture, of post-consumer whole carpet construction pieces, post-industrial carpet manufacturing edge trim selvage, or post-industrial whole carpet construction pieces. The standard, whole carpet construction, as schematically shown in FIG. 1, includes fiber tufts, backing, filler material, and adhesive material. In some arrangements, the backing can include two components: the primary backing and the secondary backing.

The primary backing is a supportive scrim through which the tufts are tufted, and is frequently polypropylene; however, other materials such as polyester can be used. The secondary backing is a fabric that is adhered behind the primary backing, sandwiching therein the back of the tufts with the adhesive material. The secondary backing is frequently made of polypropylene; however other backing types, such as jute, PVC (polyvinyl chloride), polyurethane, and PET (polyethylene terephtalate), can be used.

A filler material, such as calcium carbonate, and an adhesive material are generally applied to the backside of the tufted carpet backing as a slurry in various concentrations. There is almost always more filler than adhesive material. For example, a representative filler-to-adhesive ratio can comprise about 80 percent by weight ("wt %" or "%") calcium carbonate to about 20 wt % adhesive. While calcium carbonate is one of the most commonly employed filler materials, it should be recognized by those skilled in the art to which this disclosure pertains that carpets containing other filler materials can be used in the recycling processes described herein.

The adhesive material functions to bind the tufts with the backing. The adhesive material can include a latex, such as a carboxylic-styrene-butadiene rubber, styrene-butadiene rubber (SBR), natural rubber latex, and other natural or synthetic rubbers. While latex is one of the most commonly employed adhesive materials for holding tufts to the carpet backing, it should be recognized by those skilled in the art to which this disclosure pertains that carpets containing other adhesives can be used in the processes described herein.

The RM can undergo a series of process steps until it has been reduced to particulate matter. The particulate matter can be formed by subjecting the RM to shredding, cutting, milling, and/or any other methods of attrition. These techniques are known to those skilled in the art to which this disclosure pertains. By way of example, such processes are described in Applicant's own U.S. patent application Ser. No. 11/564,692, the contents of which are incorporated by reference herein in their entirety.

The particulate matter will generally comprise filler and adhesive material. The filler and adhesive material are friable, and the attrition step or steps can readily reduce the RM into small particles containing the filler and adhesive by the force of impact. In contrast, the polymer fibers are engineered for high tenacity, and are thus more resilient. As a result, the particulate matter can also include some of these fibers.

In recovering the filler material from the particulate matter (and, by extension, from the RM), the particulate matter can undergo a series of steps including, screening, size reduction, separation, purification, sanitization, and collection. In some instances, as will become clearer from the description below, not all of these steps are necessary. In addition, one or more of these steps can be repeated, as desired. In describing these steps, reference will be made to FIG. 2, which provides a process flow diagram for recovering the filler material.

At Step 100, particulate matter is provided that includes filler and adhesive. If the particulate matter, also includes any polymer fibers, then the fibers can be removed before subsequent processing. The fibers can be removed by a screening or filtering Step 110 or the heating Step 120. The screening step generally involves the use of a mechanical screening apparatus and/or air elutriation classification system. The effect of this step includes separating the friable filler and adhesive particles from the coarser, more intact fibers in order to enrich the stream of filler/adhesive particles. The stream of polymer fibers can be collected and used for other purposes, if desired.

At Step 110, the particular matter is screened to remove at least some of the fibers. A wide variety of particle screening systems, the equipment for which is commercially available, can be employed in whole, in part, or in combination, for the screening step. Mechanical screening/sifting can comprise a variety of techniques including, but not limited to, flat and angled vibratory single screen deck to multiple classification decks (configurations typically include rectangular and round but can comprise any geometry or physical configuration) with single axis to multiple axis vibratory actions; rotary cylindrical screening trommel devices, comprising low or high G-Force; active basket-style step cleaners, including a wide variety of cotton and wool fiber cleaning systems; and air elutriation or classification systems. Air elutriation is especially effective at removing hard and dense debris (e.g., tramp metal and the like) that may be present in the clumps of fiber or particulate matter.

Optional introduction of electrostatic ionization (i.e., free electrons) prior to, or as part of, the screening step can directionally reduce the triboelectric cling force between the filled adhesive residue and polymer fibers, allowing increased levels of separation effectiveness.

An effective screening step can generate a stream of filler and adhesive with less than 5 wt % polymer fibers. In exemplary embodiments, the screening step generates a stream containing filler and adhesive having less than 1 wt % polymer fibers. If the concentration of the polymer fiber is still higher than desired, the enriched stream of filler and adhesive can be subjected to further screening.

In some embodiments, the particulate matter is subjected to a heating operation at Step 120 as opposed to the screening Step 110. This heating step can be used to remove the adhesive and/or fibers. Since the filler generally has a higher decomposition temperature than the adhesive and fiber, the heating step may serve to remove the adhesive and/or the fibers. Depending on the composition of the adhesive and fibers, the temperature of such a heating step can be about 200 degrees Celsius (° C.) to about 600° C. For example, by heating the sample at about 200° C., over 25 wt % of all non-filler materials can be removed, and over 98 wt % of all non-filler materials can be removed by heating the sample at about 500° C.

By way of example, styrene-butadiene rubber is known to decompose rapidly and fully at about 380° C. to about 420° C. Therefore, partial removal of other components from the filler or complete removal from the filler can be achieved within the temperature range of about 200° C. to about 600° C.

In some instances, it may be advantageous to make use of even higher temperatures, as they can improve the rate of filler contaminant decomposition. While these temperatures (i.e., greater than about 600° C.) can degrade some fillers, such as calcium carbonate, they can be implemented in some embodiments where they do not degrade the particular filler being decontaminated.

Figure 2:
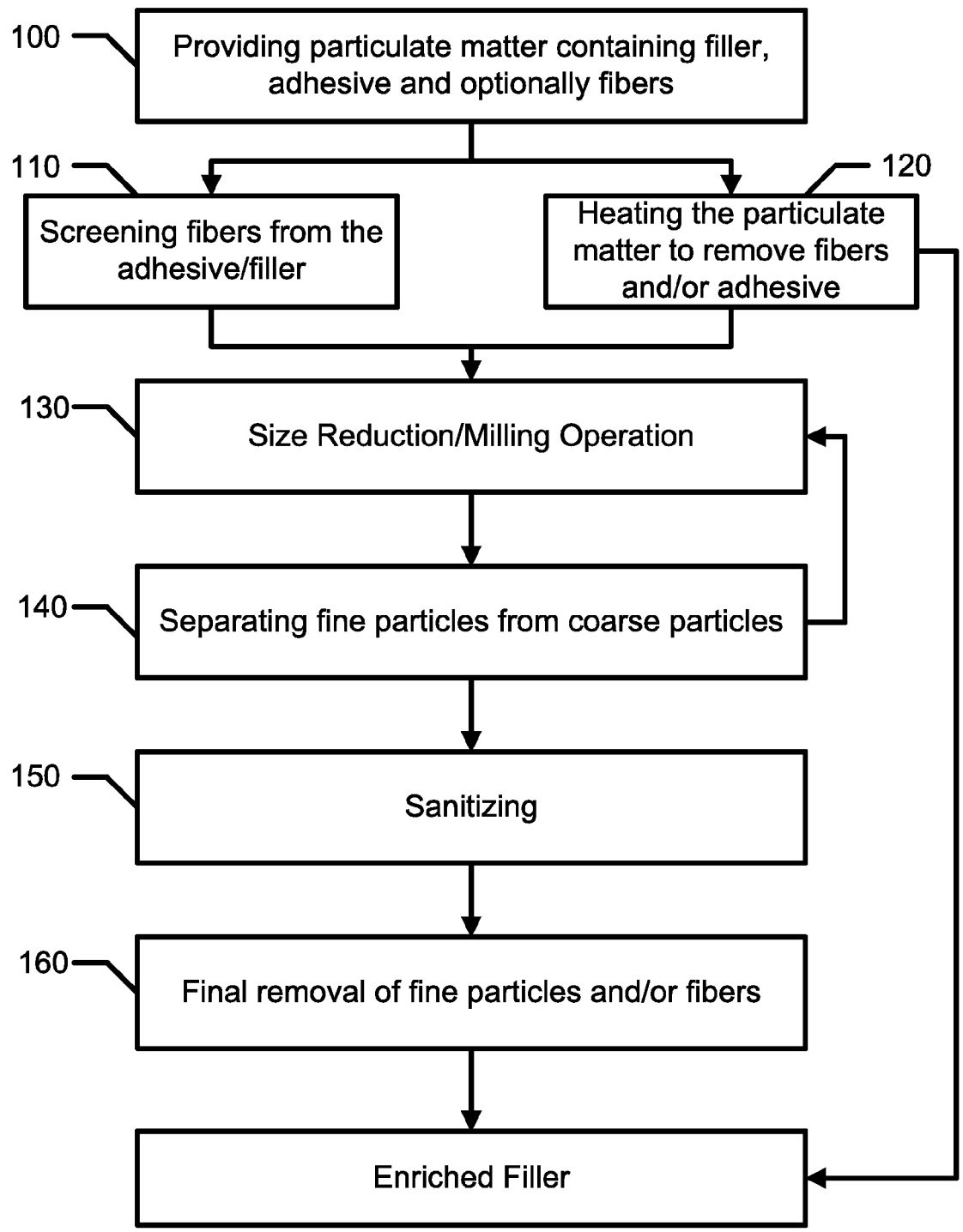
FIG. 2 is a process flow diagram illustrating a process for recovering carpet components according to some embodiments of the present invention.

Once the polymer fiber has been removed to the extent desired, if adhesive remains (i.e., if the heating step described above is not implemented at sufficiently high temperatures to remove the adhesive), the enriched stream of filler and adhesive particulate matter can undergo size reduction or milling operations at Step 130. Milling provides a more uniform particle size distribution and increases the proportion of fine particles. The stream of particulate matter from Step 120 may also undergo size reduction or milling operations at Step 130 as illustrated in FIG. 2.

By way of illustration, calcium carbonate may be mixed with latex to form a commonly used filled adhesive in carpet manufacturing and may have an industrially-accepted standard grind size. This generally adopted standard size has fifty five weight percent of the milled/ground calcium carbonate passing through a 75 micrometer screen ("+55%/75 micron"). Additionally, it is also common that the +55%/75 micron milled calcium carbonate comprises 80 weight percent of a mixture of latex and calcium carbonate. That is, an 80 weight percent filler to a 20 weight percent latex adhesive ratio common. It is also recognized that variations to this common ratio can be implemented. For example, if a higher level of fiber tuft binding is desired, the latex adhesive fractional percentage of the filled adhesive would be increased to greater than about 20 weight percent.

This calcium carbonate size (+55%/75 micron) can be further characterized by its particle size distribution. It is generally understood that an abundance of particles that are too coarse or too fine can be detrimental to the performance of the industrially accepted filled adhesive mixture. A range of commonly preferred calcium carbonate particles is from about 1 micrometer to about 400 micrometers. It is also common for the industry to utilize a bimodal distribution.

Naturally, the filler particle size distribution can be shifted to alter the performance of the filled adhesive; much like the filler to adhesive ratio can be altered to a desired filled adhesive performance.

It should become apparent that the reclaimed filler can be milled and classified to any of these common or specialized filler grind size specifications. This testifies to the ability of this reclaimed filler to be a direct replacement of virgin filler and can render a premium valuation, since no new filler resources are required to generate it.

Rendering the reclaimed filled adhesive valuable and useful as a filler for engineered polymer resin applications can require much finer particles, (e.g., in the three micrometer range). Coarser filler particles can reduce the physical properties of a filled polymer resin matrix. For example, properties such as tensile strength and impact force resistance are adversely impacted with coarse filler particles. Thus, if milling the reclaimed filled adhesive to these fine polymer requirements can not be realized or practical, then it will be necessary to first remove the adhesive fraction from the reclaimed filled/adhesive with the heating step discussed above, and mill and classify the purified reclaimed filler to the desired fine grind specifications.

A variety of milling systems are capable of being used. These include granulators having a variety of configurations and geometries, ordinary mechanical or pneumatic material handling actions, and the like. In exemplary embodiments, an impact mill or a roller mill is used.

An exemplary impact mill comprises a pneumatically evacuated hammer mill with wear resistant hammers on a rotor. The level of filler/adhesive attrition in this machine can be manipulated by a variety of parameters. These parameters, include, but are not limited to evacuation screen size and geometry; pneumatic rate (i.e., the volume of the milling chamber can be varied, which effectively relates to resonance time of the material in the milling chamber); cutting rotor speed; number of hammers, hammer geometry, and hammer position/configuration on the rotor; feed rate control and mechanism. Optimization of the mill machine parameters increases the particle size reduction effectiveness and reduces or eliminates further milling steps that could be implemented to more effectively reduce the size of the filler and adhesive particles.

An exemplary roller mill is a RAYMOND roller mill. A RAYMOND roller mill is an air swept vertical ring-roll mill with an integral classification system that simultaneously dries, pulverizes, and classifies materials. From a feedstock, the roller mill can produce particles ranging from coarse, granular products to fine particles. The level of filler/adhesive attrition in this machine can be manipulated by a variety of parameters. These parameters include, but are not limited to, the size of the feeder, roller mill size, classifier, airflow, cyclone speed, and the dust collection system. Optimization of these parameters increases the particle size reduction effectiveness and reduces or eliminates further milling steps that could be implemented to more effectively reduce the size of the filler and adhesive particles.

Another method of producing the desired particle size during the size reduction/milling step includes co-grinding the filler and adhesive particles with virgin filler. The virgin filler particles are generally harder than the adhesive/filler particles, and can thus serve as an additional attrition mechanism. An added benefit of implementing a co-grinding process is that a blend of virgin filler and recycled filler can be prepared and processed together for subsequent use. As a result, in situations where a blend of virgin filler and recycled filler will be needed, the two components do not need to be mixed by the end-user of the filler. By co-grinding during the size reduction step, a more uniform mixture may be obtained.

If the milling step results in additional fibers being separated from the filler and adhesive particles, the mixture of fibers and filler/adhesive particles can be subjected to further screening or filtering. In addition, if the size of the filler and adhesive particles is still higher than desired, the stream of filler and adhesive particles can be subjected to further milling.

At Step 140, the particles may be separated by size. In various embodiments, the finer particles can be separated from the more coarse particles using a separation step. In order to affect the separation step, a variety of techniques can be used. In situations where separation of micrometer- or sub-micrometer-scale particles from the remainder of the particles is desired, air classification or elutriation is necessary. Otherwise, any of the techniques described above for the screening step can be implemented to separate the finer filler/adhesive particles from the more coarse particles. After separation, the remaining coarse particles could then be subjected to further size reduction. This separation and additional milling cycle could be repeated until the entire stream has the desired particle size.

In embodiments where the milling device incorporates pneumatic suction to commutate the material into and out of the attrition chamber, the separation step can occur by exhausting the finer particles while allowing the more coarse particles to remain or return to the attrition chamber for further size reduction. In this manner, the finer, milled particles are continuously collected in a chamber from the pneumatic discharge exhaust stream. Collection can be effected by one of a variety of air condensers, such as a cyclone, rotary drum condenser, or the like. Many types of chambers for collecting the exhaust stream can be used. These include, but are not limited to, dust houses, baghouses, and the like, all having varying attendant costs and effectiveness. In a preferred embodiment, a continuous-duty self-cleaning (e.g., by vibration or reverse air jet) hanging bag dust collector is utilized.

At Step 150, the processes may further include a sanitization step, during which any bacteria, fungi, yeast, or the like are removed or killed. Techniques for sanitizing include heating (which may be the same heat treatment used for the heating step mentioned above, the purification step discussed below or an additional heat treatment), chemically treating the particulate matter, or physically treating the particulate matter. Sanitizing can be particularly important with filler recovery from post-consumer carpet. Any of the heating techniques described below for the purification step can also be implemented for the sanitizing step. For example, a temperature of about 100° C. to about 200° C. can be used. Chemical treatment can involve the use of one or more commercially available biocides, such as fungicides, miticides, herbicides, algicides, germicides, antibacterials, antifungals, antivirals, antiprotozoals, antiparasites, and the like. While common household bleach exhibits effective biocidal properties, in situations where calcium carbonate is the filler, an adverse reaction between the chlorine from the bleach and calcium carbonate can occur. More preferred for calcium carbonate-based situations are those broad spectrum biocides based on the general class of quaternary ammonium compounds including, but not limited to, benzalkonium chloride, alkyldimethylbenzylammonium chloride (ADBAC), carbendazine, mercarzoles, carbendazole, and other similar compounds. These and other applicable biocidal chemicals are commercially available from suppliers such at Clariant under the trade name Nipacide and Lanxess under the trade names Metasol, Biochek, Preventol, and Tektamer. Chemical treatments can be conducted either wet or dry depending on the physical state of the chemical agent.

If a wet chemical treatment is implemented, then the processes can further include a drying step to dry the particulate material. Biocides can be effectively used during any other processing step. For example, they can be implemented during the milling step. In addition, a physical treatment, such as ultraviolet germicidal irradiation (UVGI), which is the use of ultraviolet C irradiation (about 200 nanometers to about 280 nanometers) to inactivate mold, bacteria, fungus, virus and other biological and/or pathogenetic organisms. Commercial and customized UVGI equipment is available from suppliers such as Vigilair Systems, Steril-Aire, Inc., and Reyco Systems.

Once the filler material has been sanitized, it can be screened once again in order to ensure that any excessive fines and/or large particles are removed at Step 160. Otherwise, the filler material can be collected for use.

In various embodiments, the filler recovery process may include a purification step in which adhesive is removed. The purification step generally comprises heating the particulate matter to a temperature and for a time sufficient to enrich the sample with filler material. heating can include any of: direct or indirect heating, heated air, open flame treatment, high intensity infrared, or other focused heat treatments directed at the filler/adhesive particles. As would be expected, longer temperatures and longer durations will lead to increased purity of filler. The exact conditions, however, should be selected such that the adhesive volatilizes rather than decomposes. An effective purification step can generate a stream of filler with less than about 20 wt % adhesive. In exemplary embodiments, the purification step generates a stream containing filler having less than about 1 wt % adhesive, or no adhesive remaining. A particularly suitable system for removing the adhesive is a calciner.

The purification step can occur during or after the size reduction step. In some situations, hot air can be fed into the mill attrition chamber during the size reduction step to effect the removal of the adhesive. By way of example, when a latex adhesive is used, hot air having a temperature of greater than about 200° C. can be fed into the attrition chamber for a short duration. These conditions should be sufficient to provide the mixture with less than about 20 wt % latex adhesive. At the higher end of the temperature range and/or for longer durations, the mixture can have less than about 1 wt % adhesive residue or even no adhesive. In other instances, the screened and milled particles can be heated after the size reduction step (and optional separation and/or co-grinding steps). For example, after being collected from the milling device, the filler/adhesive particles can be heated directly in the collection chamber. The heating can comprise flowing hot air into the collection chamber, directly heating the collection chamber, directly exposing the screened and milled particles to a heat source, or a combination thereof.

The final recovered filler material can be used alone, or in combination with other (virgin or recycled) filler materials in various situations that call for a filler material or mineral reinforcement. The purity and particle size of the recovered filler may play a role in dictating where the recovered filler can be used. For example, larger concentrations of adhesive will generally prevent the recovered filler from being used as a filler or mineral reinforcement in a melt-extrudable polymer where the polymer has a melting temperature that is higher than the decomposition temperature of the adhesive. Also, the presence of residual latex, froth aides, and thickeners can complicate the extrusion process since these so-called "contaminated" fillers can liberate undesirable volatile organic compounds, which can result in the final product exhibiting an objectionable odor. Therefore, adhesives in the recovered filler could leave an unacceptable appearance, voids, or an odor in the melt-extrudable polymer. Such filler, however, could be used to produce new carpeting, thus displacing at least a portion of the virgin filler typically used. Examples of such exemplary uses are disclosed in Applicant's own U.S. Pat. Nos. 6,786,988, 6,814,862, and 7,045,590, each of which is incorporated herein by reference in its entirety.

The various embodiments of the present invention are illustrated by the foregoing non-limiting examples. While the invention has been disclosed in its preferred forms, it will be apparent to those skilled in the art that many modifications, additions, and deletions can be made therein without departing from the spirit and scope of the invention and its equivalents as set forth in the following claims.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A recovery process for recovering filler material from carpet waste, said recovery process comprising the steps of:
   providing carpet waste that includes at least one of post-industrial carpet, carpet selvage, or post-consumer carpet;
   size-reducing the carpet waste into particulate matter comprising polymer fibers, filler material and adhesive material;
   separating the particulate matter into a first stream comprising substantially polymer fibers and a second stream comprising substantially filler material and adhesive material; and
   heating the second stream at a temperature that volatizes at least some of the polymer fibers remaining in the second stream to enrich the content of filler material in the second stream.

2. The recovery process of claim 1, wherein the temperature is between 200° C. and 600° C.

3. The recovery process of claim 1, wherein the temperature is sufficient to volatize the adhesive within the second stream.

4. The recovery process of claim 3, wherein the second stream comprises less than 5 wt% adhesive after the heating step.

5. The recovery process of claim 3, wherein the second stream comprises less than 1 wt% adhesive after the heating step.

6. The recovery process of claim 1 further comprising the step of size-reducing the second stream.

7. The recovery process of claim 6, wherein the size-reducing step includes co-grinding the second stream with virgin filler to produce a more uniform mixture.

8. The recovery process of claim 6, wherein the step of heating the second stream comprises directing air having a temperature greater than 200° C. into a mill attrition chamber where the second stream is being size reduced.

9. The recovery process of claim 1 further comprising the step of using the second stream after the heating step in the manufacture of carpet.

10. A recovery process for recovering filler material from carpet waste, said recovery process comprising the steps of:
- providing carpet waste that includes at least one of post-industrial carpet, carpet selvage, or post-consumer carpet;
- size-reducing the carpet waste into particulate matter comprising polymer fibers, filler material and adhesive material;
- screening the particulate matter to separate a first stream comprising the polymer fibers from a second stream comprising the filler material and the adhesive material;
- size-reducing the second stream using attrition methods to create size reduced particles;
- heating the size-reduced second stream to a temperature sufficient to volatize at least some of the fibers to enrich the content of filler material in the second stream thereby creating an enriched second stream; and
- separating the size reduced particles based on size.

11. The recovery process of claim 10, wherein the heating step and the second stream size-reducing step occur simultaneously.

12. The recovery process of claim 10, wherein the temperature is between 200° C. and 600° C.

13. The recovery process of claim 10, wherein the second stream size-reducing step includes co-grinding the second stream with virgin filler to produce a more uniform mixture.

14. The recovery process of claim 10, wherein the enriched second stream comprises less than 5 wt% adhesive.

15. The recovery process of claim 10, wherein the enriched second stream comprises less than 1 wt% adhesive.

16. The recovery process of claim 10, wherein the second stream size-reducing step comprises a milling operation and the heating step comprises directing air having a temperature greater than 200° C. into a milling chamber where the milling operation is being performed.

17. The recovery process of claim 10, further comprising the introduction of electrostatic ionization prior to screening, wherein the electrostatic ionization directionally reduces triboelectric cling forces between the fibers, filler and adhesive, enhancing the liberation of fibers from the filler and adhesive.

* * * * *